(12) United States Patent
Cheng et al.

(10) Patent No.: US 10,900,906 B2
(45) Date of Patent: Jan. 26, 2021

(54) SURFACE ENHANCED RAMAN SCATTERING SUBSTRATE

(71) Applicant: International Business Machines Corporation, Armonk, NY (US)

(72) Inventors: Kangguo Cheng, Schenectady, NY (US); Juntao Li, Schenectady, NY (US); Ruilong Xie, Niskayuna, NY (US); Chanro Park, Clifton Park, NY (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 16/432,588

(22) Filed: Jun. 5, 2019

(65) Prior Publication Data

US 2020/0386685 A1    Dec. 10, 2020

(51) Int. Cl.
*G01J 3/44* (2006.01)
*G01N 21/65* (2006.01)
*B22F 9/16* (2006.01)
*B22F 1/00* (2006.01)

(52) U.S. Cl.
CPC ......... *G01N 21/658* (2013.01); *B22F 1/0044* (2013.01); *B22F 9/16* (2013.01); *G01J 3/44* (2013.01)

(58) Field of Classification Search
CPC ...... G01N 21/658; G01N 21/64; G01N 21/65; B22F 9/16; B22F 1/0044; G01J 3/44
See application file for complete search history.

(56) References Cited

U.S. PATENT DOCUMENTS

| | | | |
|---|---|---|---|
| 8,547,549 B2 | 10/2013 | Kuo et al. | |
| 8,767,202 B2 | 7/2014 | Schmidt et al. | |
| 8,999,183 B2 | 4/2015 | Van Roy et al. | |
| 9,001,322 B2 | 4/2015 | Erickson et al. | |
| 9,057,704 B2 | 6/2015 | Smirnov et al. | |
| 9,500,592 B2 | 11/2016 | Lin et al. | |
| 9,873,152 B2 | 1/2018 | Shih | |
| 2016/0032106 A1 | 2/2016 | Fontana et al. | |
| 2019/0017934 A1 | 1/2019 | Chou et al. | |
| 2019/0049386 A1* | 2/2019 | Ge | G01N 21/658 |

FOREIGN PATENT DOCUMENTS

KR    20180000612 A    1/2018

* cited by examiner

*Primary Examiner* — Abdullahi Nur
(74) *Attorney, Agent, or Firm* — Randall Bluestone; Ryan, Mason & Lewis, LLP

(57) ABSTRACT

An apparatus includes a substrate having a base and a plurality of pillars extending from the base where the pillars are configured to define a nano-array, a dielectric disposed on the base, and a plasmonic coating disposed on a surface of the dielectric and on one or more of the pillars.

20 Claims, 13 Drawing Sheets

SURFACE ENHANCED RAMAN SCATTERING SUBSTRATE

BACKGROUND

Illustrative embodiments relate generally to Raman scattering or spectroscopy, and, more particularly, relate to a surface enhanced Raman scattering substrate and a method of manufacture thereof.

Surface enhanced Raman spectroscopy or surface enhanced Raman scattering (SERS) is a powerful spectroscopy technique that enables the detection of highly sensitive structural low concentration analytes through the amplification of electromagnetic fields generated by the excitation of localized surface plasmons. The substrate surface on which the detection of analytes is taking place, as well as the material of the substrate surface, affects the strength and intensity of the Raman scattering and thus the detectability of the analyte. Currently available substrates for use in SERS suffer from various deficiencies including the lack of dense and uniform SERS arrays which detract from the uniform detection of Raman scattering. Furthermore, current substrates are expensive and difficult to manufacture. The manufacturing of the substrates can require burdensome and expensive lithographically patterned masking and etch-stopping layers. The lithography process also limits the density of the features on the substrate surface that enhances Raman scattering and thus the intensity of the observed signals.

SUMMARY

Embodiments described herein provide methods of forming surface enhanced Raman scattering (SERS) structures.

In one illustrative embodiment, an apparatus comprises a substrate including a base and a plurality of pillars extending from the base, where the pillars are configured to define a nano-array, a dielectric disposed on the base and a plasmonic coating disposed on a surface of the dielectric and on one or more of the pillars.

In another illustrative embodiment, a method comprises forming a substrate including a base and a plurality of pillars extending from the base and arranged in spaced relation, removing material from end portions of the pillars to define a nano-array, depositing a dielectric on the base of the substrate, coating with a plasmonic film the end portions of the pillars defining the nano-array and the dielectric and removing plasmonic film segments around each of the end portions of the pillars.

In yet another illustrative embodiment, a method comprises forming a substrate including a base and a plurality of pillars extending from the base and arranged in spaced relation, applying a liner onto the pillars and the base, depositing an oxide fill on the base to fill gaps between the pillars, planarizing the oxide fill to be coplanar with the pillars, removing at least a portion of the oxide fill and the liner to at least partially expose the pillars, removing material from end portions of the pillars by one of an oxidation process and an etching process to form tapered tip portions, depositing a second oxide fill onto the base of the substrate, exposing the tapered tip portions of the pillars from the second oxide fill, coating with a plasmonic metal film the tapered tip portions of the pillars and an exposed surface of the second oxide fill, and removing plasmonic film surrounding each tapered tip portion of the pillars to isolate the plasmonic film on the tapered tip portions from the plasmonic film on the surface of the second oxide film to define a nanotip array.

These and other features, objects and advantages of illustrative embodiments will become apparent from the following detailed description of illustrative embodiments thereof, which is to be read in connection with the accompanying drawings.

DETAILED DESCRIPTION

The present application relates generally to surface enhanced Raman scattering (SERS), and more particularly to SERS substrates and methods of manufacture thereof.

Raman signals are inherently weak, especially when utilizing visible light excitation. One methodology to enhance or amplify Raman signals is to employ SERS. SERS uses nanoscale roughened metal surfaces typically made of gold (Au) or silver (Ag). Laser excitation of these roughened metal nanostructures resonantly drives the surface charges creating a highly localized (plasmonic) light field. When a molecule is absorbed or lies close to the enhanced field at the surface, a large enhancement in the Raman signal can be observed. SERS is finding increasing use in a variety of applications including, but not limited to, analytical chemistry testing, chemical substance testing, biosensors detection, forensics, detecting of trace amounts of chemical and biological threat agents, and other medical diagnostic devices.

One of the issues encountered in the fabrication of a SERS substrate is the difficulty in forming dense and uniform grouping of SERS nanostructures. Moreover, the effectiveness of the SERS substrate requires nanostructured substrate arrays with precisely controlled shapes and sizes. Uniformity of the nanostructured substrates over large scales is important, since Raman signal intensity is often extremely sensitive to the size, shape, and morphology of the nanostructures on a substrate. For practical applications, substrates with high reproducibility are most suitable as they allow consistent generation of SERS results.

In illustrative embodiments, techniques are provided for fabricating structures comprised of SERS nanostructures or nano-arrays including semiconductor devices. It is to be understood that the various layers, substrates, and regions shown in the accompanying drawings are schematic illustrations that are not drawn to scale. In addition, for ease of explanation, one or more layers, structures, and regions of a type commonly used to form the SERS structures and/or semiconductor devices comprising SERS nanostructures may not be explicitly shown in a given drawing. This does not imply that any layers, structures, and regions not explicitly shown are omitted from the actual structures.

Furthermore, it is to be understood that the embodiments discussed herein are not limited to the particular materials, features, and processing steps shown and described herein. In particular, with respect to processing steps, it is to be emphasized that the descriptions provided herein are not intended to encompass all of the processing steps that may be required to form a functional SERS structure such as a semiconductor device. Rather, certain processing steps that are commonly used, such as, for example, wet cleaning and annealing steps, are purposefully not described herein for economy of description.

Moreover, the same or similar reference numbers are used throughout the drawings to denote the same or similar features, elements, or structures, and thus, a detailed explanation of the same or similar features, elements, or structures will not be repeated for each of the drawings. The terms "about" or "substantially" as used herein with regard to thicknesses, widths, percentages, ranges, etc., are meant to denote being close or approximate to, but not exactly. For example, the term "about" or "substantially" as used herein implies that a small margin of error is present. Further, the terms "vertical" or "vertical direction" or "vertical height" as used herein denote a Z-direction of the Cartesian coordinates shown in the drawings, and the terms "horizontal," or "horizontal direction," or "lateral direction" as used herein denote an X-direction and/or Y-direction of the Cartesian coordinates shown in the drawings.

Additionally, the term "exemplary" or "illustrative" is used herein to mean "serving as an example, instance or illustration." Any embodiment or design described herein is intended to be "illustrative" and is not necessarily to be construed as preferred or advantageous over other embodiments or designs. The term "connection" can include both an indirect "connection" and a direct "connection." The terms "upper," "over," "overlying," "lower," "under," "underlying," "right," "left," "vertical," "horizontal," "top," "bottom," and derivatives thereof shall relate to the embodiments of the disclosure, as it is oriented in the drawing figures. The term "positioned on" means that a first element, such as a first structure, is present on a second element, such as a second structure, wherein intervening elements, such as an interface structure, e.g. interface layer, may be present between the first element and the second element. The term "direct contact" means that a first element, such as a first structure, and a second element, such as a second structure, are connected without any intermediary conducting, insulating or semiconductor layers at the interface of the two elements.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present concept.

An illustrative embodiment of a SERS structure and method of fabricating the SERS structure will be described below with reference to FIGS. 1-10. Note that the same reference numeral (100) is used to denote the SERS structure through the various intermediate fabrication stages illustrated in FIGS. 1-10. Note also that the SERS structure described herein can also be considered to be a semiconductor device and/or an integrated circuit, or some part thereof. For the purpose of clarity, some fabrication steps leading up to the production of the SERS structure as illustrated in FIGS. 1-10 are omitted. In other words, one or more well-known processing steps which are not illustrated but are well-known to those of ordinary skill in the art have not been included in the figures.

Figure 1:
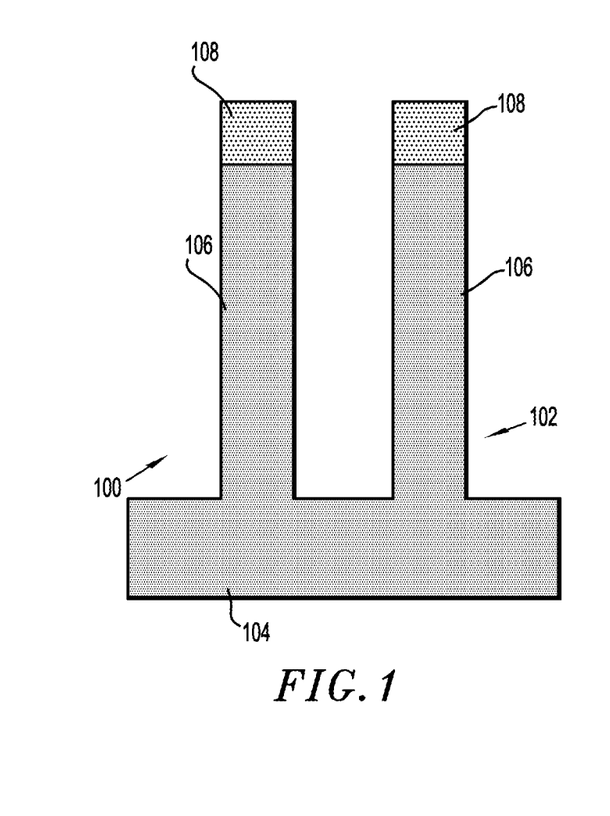
FIG. 1 is a side cross-sectional view of a SERS structure at a first intermediate fabrication stage, according to one or more illustrative embodiments.
Figure 2:
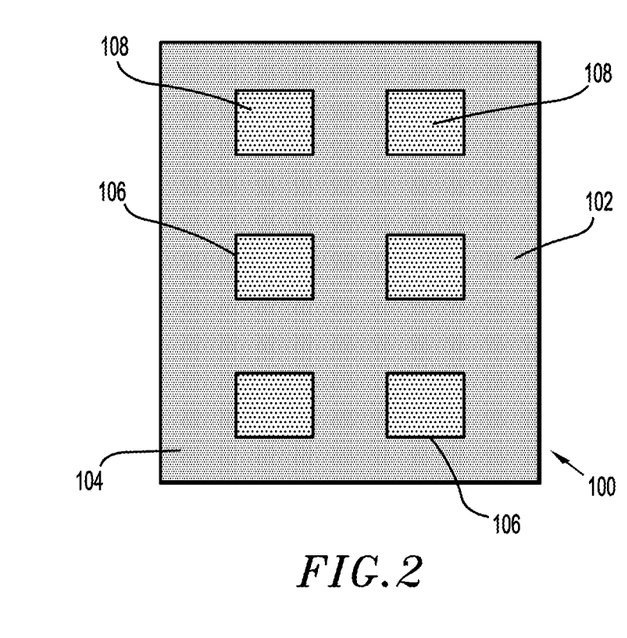
FIG. 2 is a top plan view of the SERS structure of FIG. 1 at the first intermediate fabrication stage, according to one or more illustrative embodiments.

FIG. 1 illustrates a cross-sectional view of the SERS structure 100 through the pillar width at a first-intermediate fabrication stage, and FIG. 2 is top plan view of the SERS structure at the first-intermediate fabrication stage. The SERS structure 100 in FIGS. 1 and 2 is shown comprising a silicon (Si) substrate 102 having a base 104 and vertical pillars 106 having a hard mask 108, for example, of silicon nitride (SiN). In this embodiment, the SERS structure 100 may be a semiconductor device. The array(s) of dense silicon vertical pillars 106 with sub lithographic dimensions with the silicon nitride (SiN) hard mask top 108 can be formed via a self-aligned double patterning (SADP) process, also known as spacer-assisted double patterning, or a sidewall image transfer (SIT) process.

In one illustrative embodiment, the pillars 106 include a 10 nanometer (nm)×10 nm square top and a 40 nm pitch with the pitch being defined as the periodical spacing between the centers of adjacent pillars 106. Other dimensions are also contemplated. In addition, the material of the substrate 102 may include glass, ceramic or a polymer or any material suitable for use in accordance with the embodiments described herein.

Figure 3:
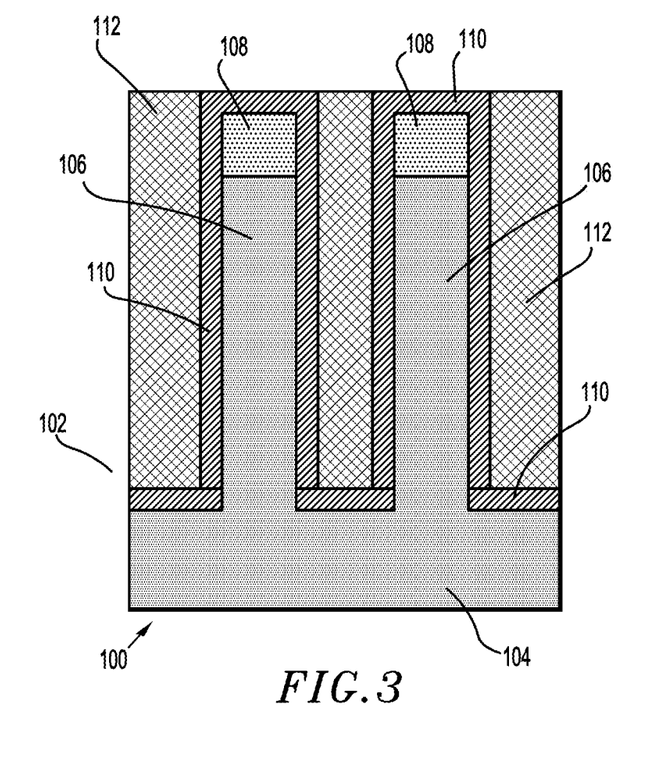
FIG. 3 is a side cross-sectional view of a SERS structure of FIG. 2 at a second intermediate fabrication stage, according to one or more illustrative embodiments.

With reference to FIG. 3, a subsequent step in the process includes applying a liner 110 at least on the walls of the pillars 106 and also onto the base 104 of the substrate 102. The liner 110 may comprise silicon nitride (SiN). Thereafter, the gaps or spacings between the pillars 106 are filled with a dielectric 112 such as an oxide or silicon oxide fill, which is deposited on the substrate 102. The dielectric 112 is subject to a planarization process so as to be coplanar with the top of the pillars 106 inclusive of the liner 110.

Figure 4:
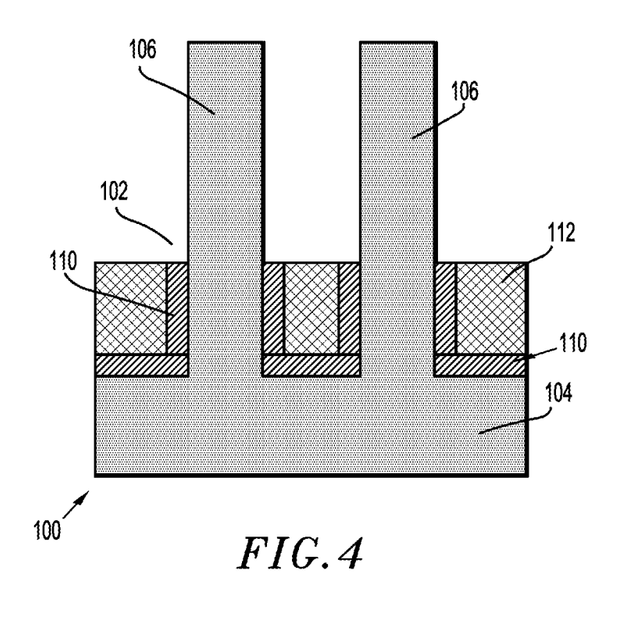
FIG. 4 is a side cross-sectional view of a SERS structure of FIG. 3 at a third intermediate fabrication stage, according to one or more illustrative embodiments.
Figure 5:
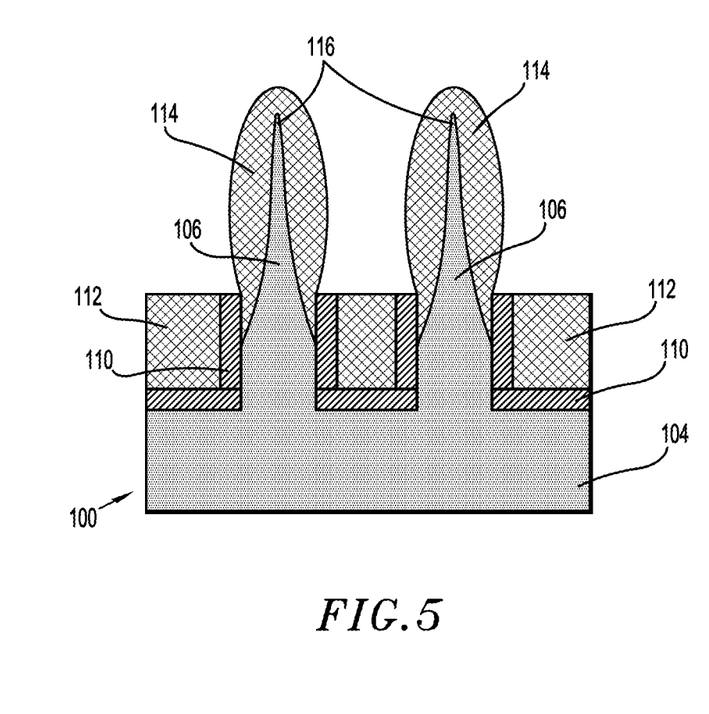
FIG. 5 is a side cross-sectional view of a SERS structure of FIG. 4 at a fourth intermediate fabrication stage, according to one or more illustrative embodiments.

The dielectric 112 and the liner 110 are thereafter recessed below the midpoint of the pillars 106 through conventional techniques including an etching, for example, a directional etching technique, to expose an upper segment of the pillars 106, as depicted in FIG. 4. The hard mask 108 also is removed. With reference to FIG. 5, the pillars 106 are subject to an oxidation process to turn a portion of the exposed silicon pillar 106 into an oxide 114. The oxidation is controlled to produce a tapered tip segment 116 on each pillar 106. The SiN liner 110 protects the lower portion of the pillars 106 during the oxidation process. The oxidation process can be a thermal oxidation process, chemical oxidation process, plasma oxidation process, or any other suitable oxidation process. In some embodiments, the oxidation process can be a rapid thermal oxidation (RTO) process at temperature ranging from 400° C. to 1200° C. in an environment containing oxygen or water vapor. The oxidation environment may further include other gases such as hydrogen, helium, nitrogen, argon, xenon. The oxidation time can range from 10 seconds to 2 hours, depending on the oxidation temperature and the pressure of the oxidation species (oxygen, water vapor). In some embodiments, the oxidation is performed at a temperature ranging from 150° C. to 400° C. with oxygen plasma or ozone gas. Other oxidation conditions are also conceived. The resulted oxide 114 is thereafter removed. The oxidation/oxide removal process can be repeated multiple time to produce the tapered tip segment 116 on each pillar 106. In some embodiments, the resulted oxide is maintained.

Figure 6:
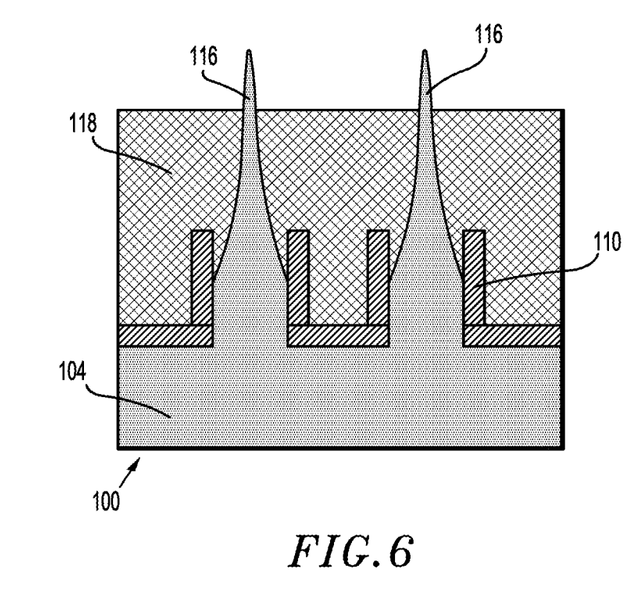
FIG. 6 is a side cross-sectional view of a SERS structure of FIG. 5 at a fifth intermediate fabrication stage, according to one or more illustrative embodiments.
Figure 7:
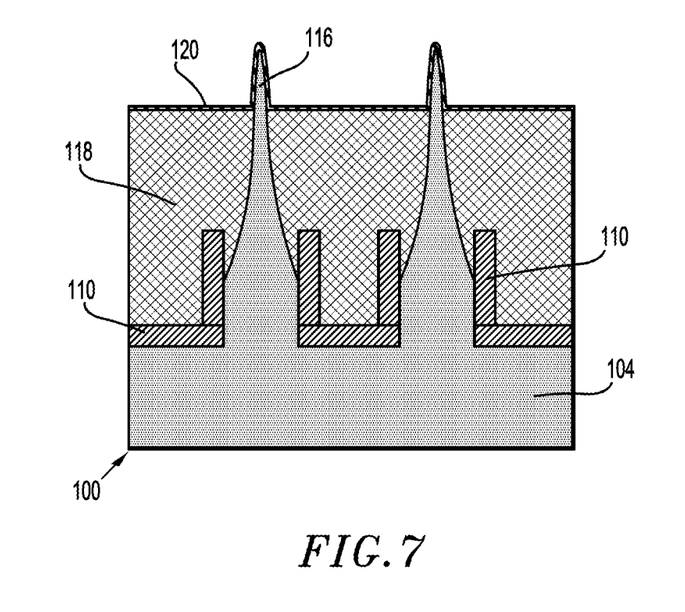
FIG. 7 is a side cross-sectional view of a SERS structure of FIG. 6 at a sixth intermediate fabrication stage, according to one or more illustrative embodiments.

Referring now to FIG. 6, the SERS structure 100 is filled with another dielectric or second oxide 118 such as silicon oxide, and the oxide is recessed to expose the tapered tip segment 116 of the pillars 106. Thereafter, as depicted in FIG. 7, the top planar surface of the oxide layer 118 and the tapered tip segments 116 of the pillars 106 of the SERS structure 100 are coated with a plasmonic metal film 120 including, but not limited to, gold, silver, aluminum, iridium, palladium, copper or the like. The coating of the plasmonic film may be effected via a chemical vapor deposition process or an atomic layer deposition process.

Figure 8:
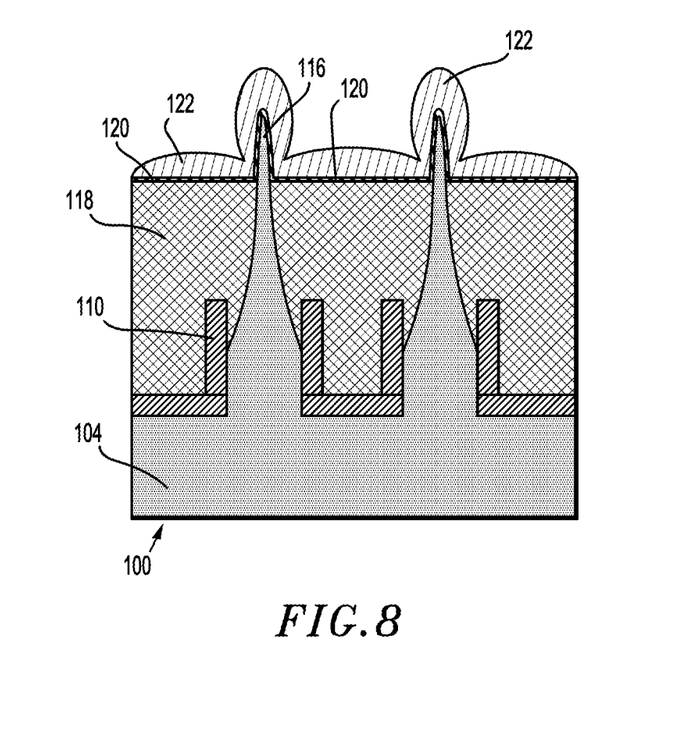
FIG. 8 is a side cross-sectional view of a SERS structure of FIG. 7 at a seventh intermediate fabrication stage, according to one or more illustrative embodiments.

With reference now to FIG. 8, a non-conformal deposition of a sacrificial material 122, for example, an amorphous silicon or other sacrificial material, is deposited on the SERS structure 100 via a high-density plasma deposition (HDP) process. The sacrificial material 122 is used to protect the metal tapered tip segment 116 of the pillars 106. In accordance with one illustrative embodiment, the non-conformal deposition is controlled to apply more sacrificial material on the tapered tip segment 116 and the top planar surface of the oxide layer 118, and less sacrificial material at the base of the tapered tip segment 116, i.e., at the juncture of the tapered tip segments 116 and the sacrificial material 122.

Figure 9:
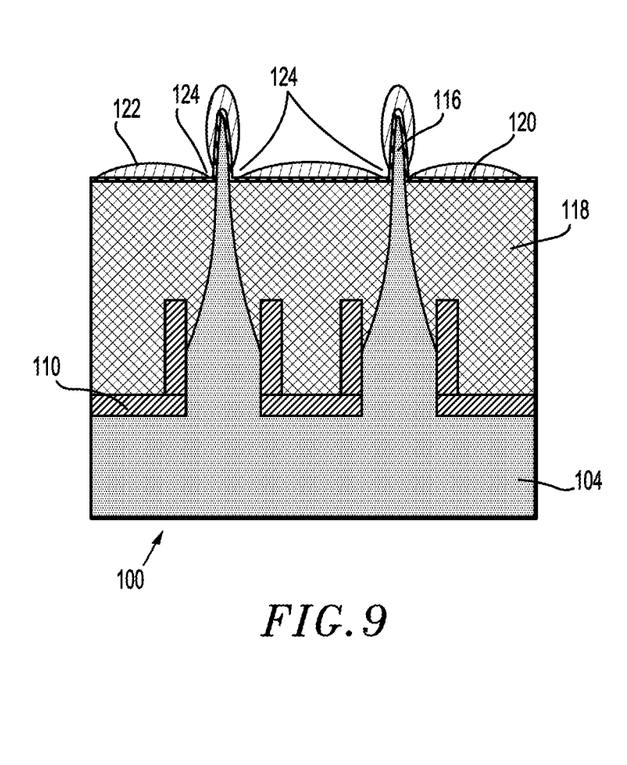
FIG. 9 is a side cross-sectional view of a SERS structure of FIG. 8 at an eighth intermediate fabrication stage, according to one or more illustrative embodiments.

With reference to FIG. 9, an etching process is utilized to etch back the sacrificial material 122 to expose portions of the tapered tip segments 116 at the junctures 124 (e.g., corners) of the tapered tip segments 116 and the sacrificial material 122. Thereafter, the plasmonic film 120 located at the junctures 124 of the tapered tip segments 116 and the sacrificial material 122 is removed via an etching process to disconnect or isolate the tapered tip segments 116 of the pillars 106 from the remaining coated plasmonic film 120. More specifically, the etching process forms a gap around each tapered tip segment 116 devoid of plasmonic film 120 such that the plasmonic film 120 is discontinuous or separated at the tapered tip segments 16 of the pillars 106.

Figure 10:
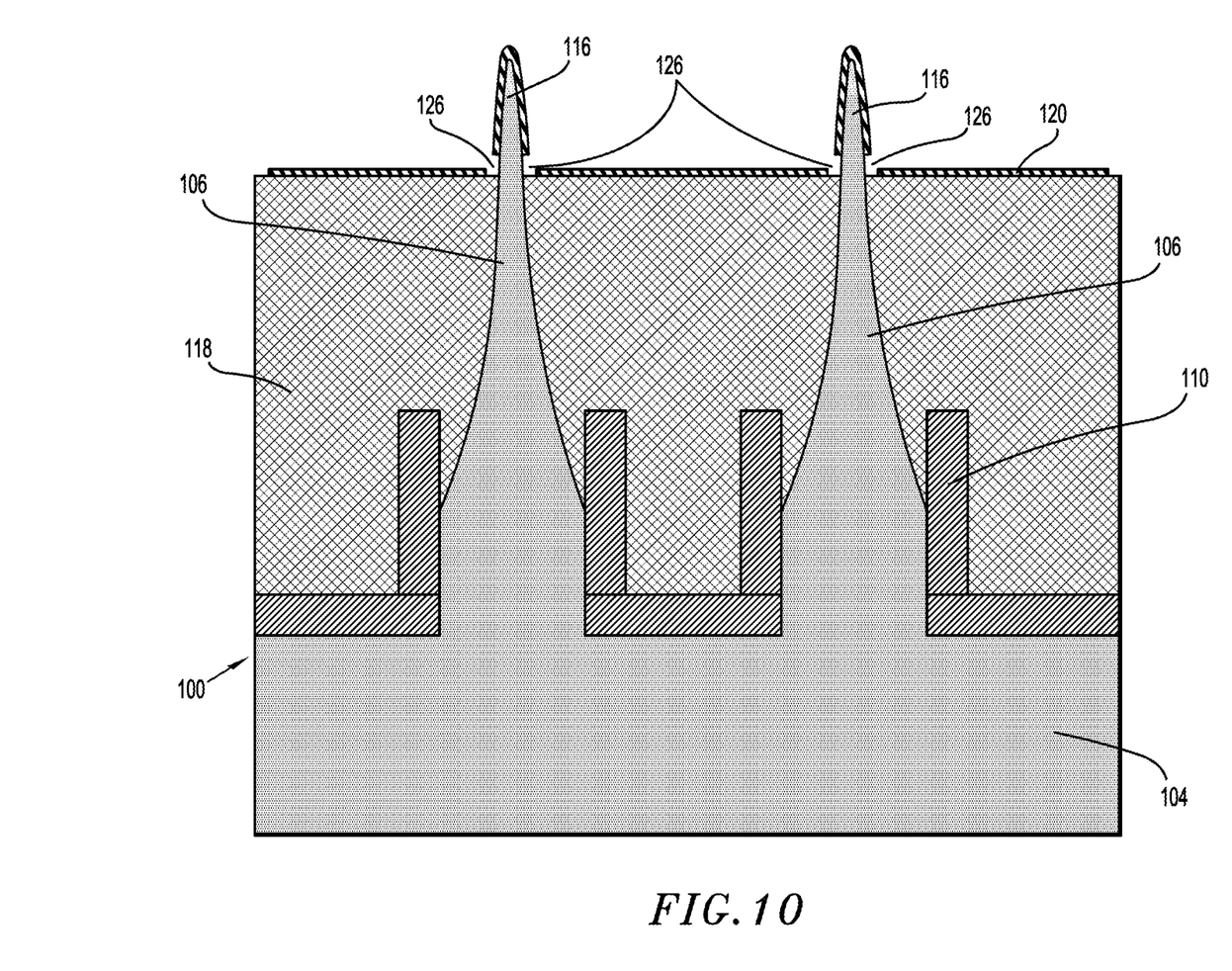
FIG. 10 is a side cross-sectional view of a SERS structure of FIG. 9 at a ninth intermediate fabrication stage, according to one or more illustrative embodiments.

With reference now to FIG. 10, the sacrificial material 122 is removed from the SERS structure 100 via an etching process such as, for example, an ammonia etch. FIG. 10 also illustrates the gaps 126 in the plasmonic film 120 disposed around each tapered tip segment 116 of the pillars 106. Subsequent to this step, each tapered tip segment 116 has a metal plasmonic film 120 which is isolated from the remaining planar plasmonic film 120 on the oxide fill or layer 118.

Figure 11:
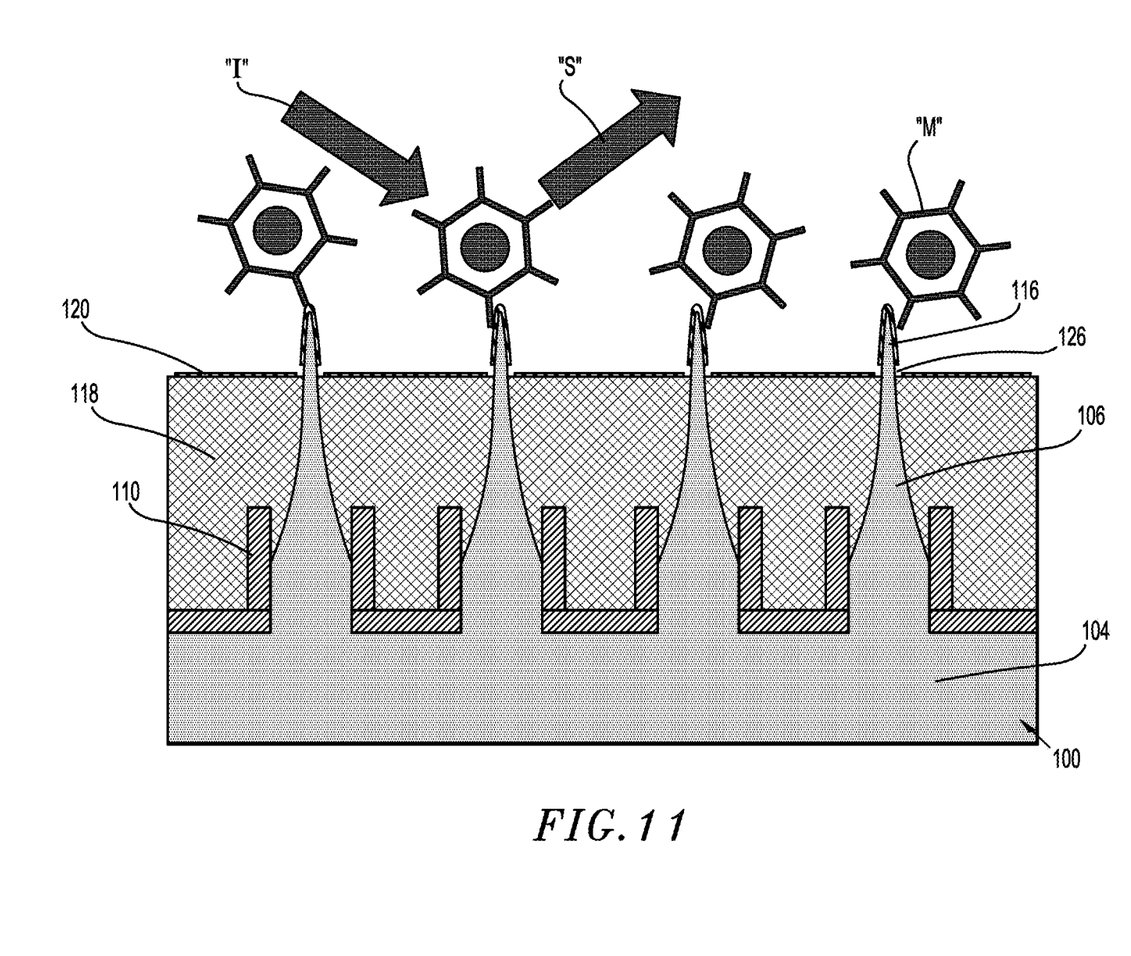
FIG. 11 is a view illustrating use of the SERS structure in detecting analytes.

FIG. 11 is a schematic of use of the SERS structure 100 in detecting an analyte. Incident light, for example laser light, represented by arrow "I" is directed onto the dense and uniform grouping of nanoarray or nanostructures defined by the metal tapered tip segments 116 of the pillars 106 of the SERS structure 100. Laser excitation at a desired frequency selected for the plasmonic metal of these tips segments 116 resonantly drives the surface charges creating a highly localized (plasmonic) light field. When a molecule "M" is absorbed or lies close to the enhanced field at the surface, a large enhancement in the output SERS signal "S" can be observed due to the uniform, dense grouping of the tapered tip segments 116, i.e., several orders of magnitude greater than normal Raman scattering. The collected SERS signals "S" are analyzed to identify a change in frequency which provides an indication of the type of molecule or analyte on the SERS structure 100.

Figure 12:
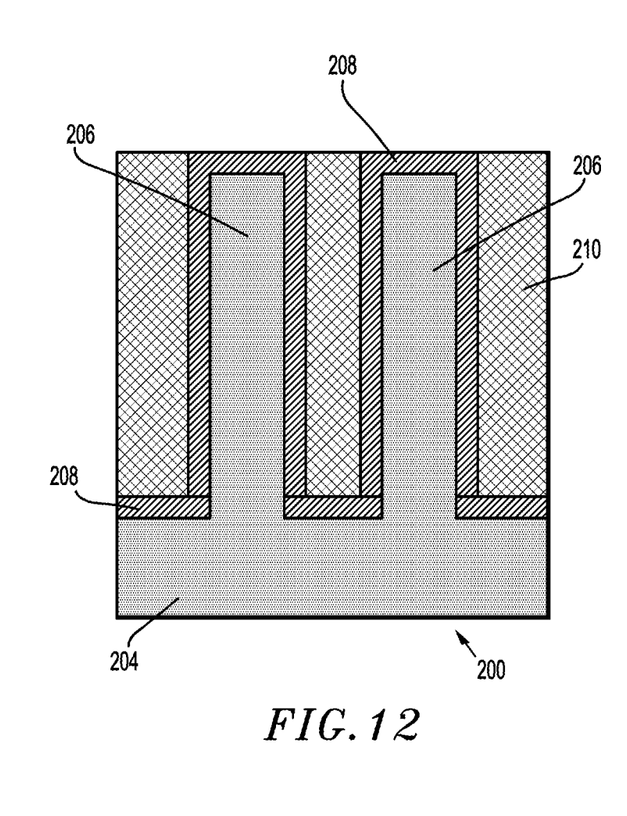
FIG. 12 is a side cross-sectional view of another illustrative embodiment of a SERS structure at a first-intermediate fabrication stage, according to one or more illustrative embodiments.

Referring now to FIG. 12, another illustrative embodiment of the SERS structure 200 of is disclosed. In this embodiment, an etching process is utilized to form the sharpened tips of the pillars. Also, in this embodiment, the substrate 202 can be formed of other materials, for example, glass, ceramic or another suitable polymer, not necessarily silicon nitride. An etching process is performed on the substrate 202 as discussed hereinabove in connection with the embodiment of FIGS. 1-10 to define a base 204 and the pillars 206 extending from the base 204. As depicted in FIG. 12, the SiN hard mask is removed and a sacrificial liner 208 is deposited on the pillars 206 and the substrate base 204. The sacrificial liner 208 may include titanium nitride (TiN) or Lanthanum Oxalate (LaOx). A dielectric 210, for example, silicon oxide, is applied to the SERS structure 200 and then planarized to be coterminous with the vertical tops of the pillars 206 inclusive of the sacrificial liner 208.

Figure 13:
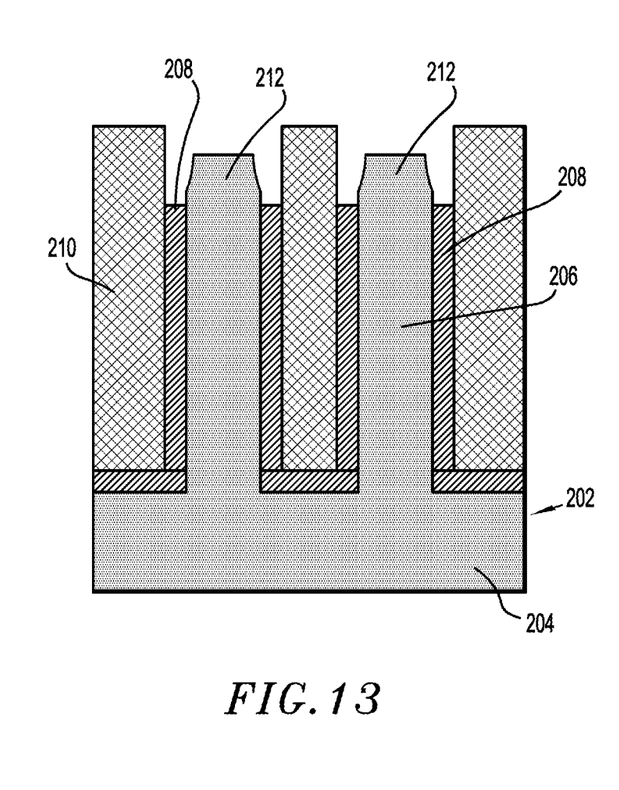
FIG. 13 is a side cross-sectional view of a SERS structure of FIG. 12 at a second intermediate fabrication stage, according to one or more illustrative embodiments.

With reference to FIG. 13, the sacrificial liner 208 around the vertical top of the pillars 206 is removed to expose the top segments 212 of the pillars 206. A wet etching process may be utilized to remove the sacrificial liner 208 around the top segments 212 of the pillar 206. In embodiments, the etchant chemical does not need to be 100% selective such that top segments 212 of the pillars 206 may also be eroded or removed. In other embodiments, the wet recess chemistry is 100% selective such that there is no erosion on the top of the pillar.

Figure 14:
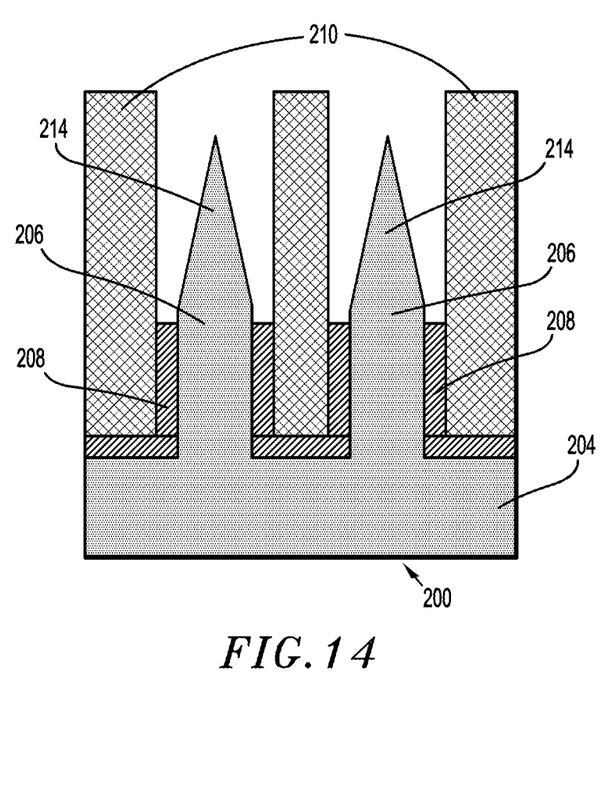
FIG. 14 is a side cross-sectional view of a SERS structure of FIG. 13 at a third intermediate fabrication stage, according to one or more illustrative embodiments.
Figure 15:
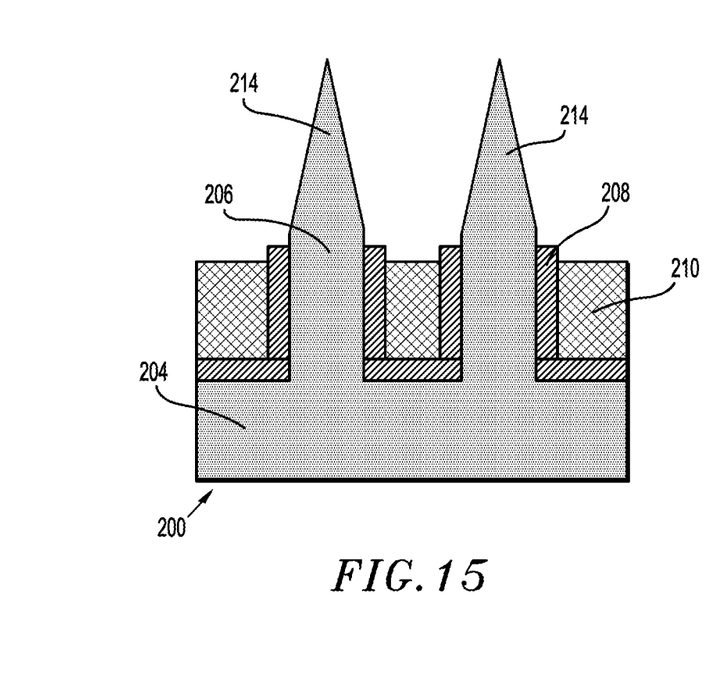
FIG. 15 is a side cross-sectional view of a SERS structure of FIG. 14 at a fourth intermediate fabrication stage, according to one or more illustrative embodiments.
Figure 16:
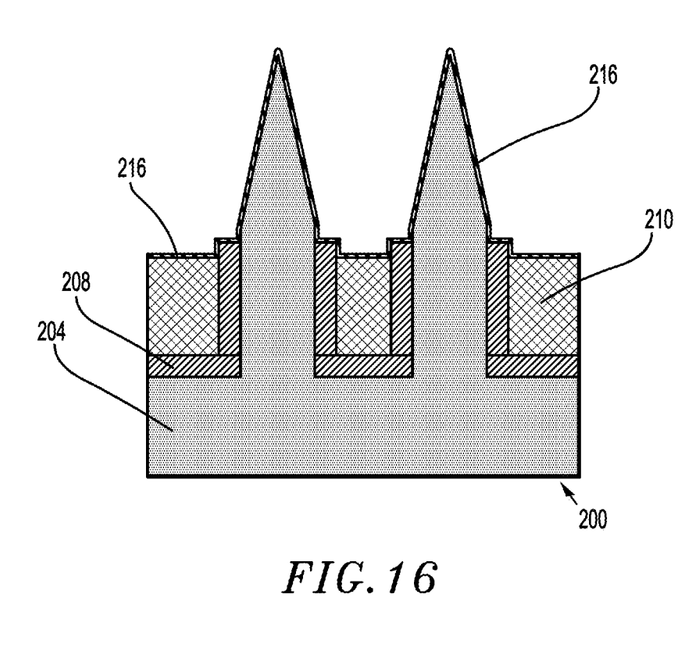
FIG. 16 is a side cross-sectional view of a SERS structure of FIG. 15 at a fifth intermediate fabrication stage, according to one or more illustrative embodiments.

Referring now to FIG. 14, a selective directional etching such as reactive ion etch (RIE) is performed to sharpen the top segments 212 of the pillars 206 to define tapered tip segments 214 and remove the sacrificial liner 208. Thereafter, the dielectric or oxide 210 is recessed (FIG. 15) to expose the tapered tip segments 214 of the pillars 206, and the substrate is coated with a plasmonic metal film 216, for example, gold. (FIG. 16). In this illustrative embodiment, the step of refilling the SERS structure with a dielectric as discussed in connection with FIG. 6 is avoided. The process is continued as discussed hereinabove in connection with FIGS. 8-10 to remove the plasmonic film material 216 at the corner or juncture of the tapered tip segments 214 to form the dense and uniform grouping nanoarray or nanostructures defined by the metal isolated tapered tip segments 214 of the pillars 206.

Figure 17:
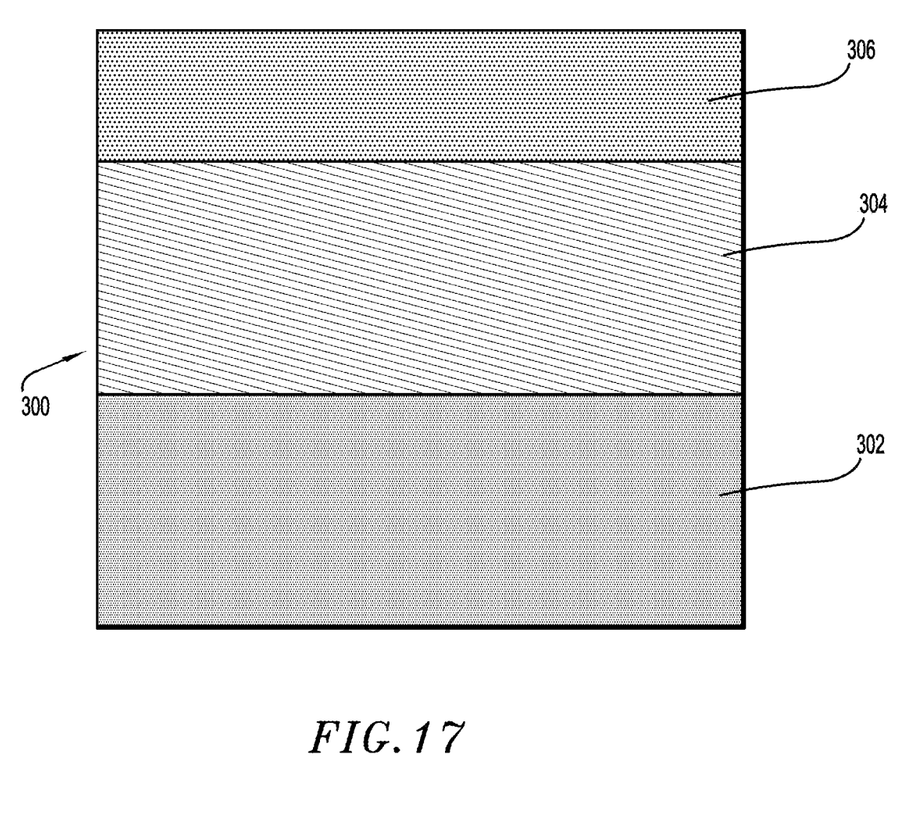
FIG. 17 is a side cross-sectional view of another illustrative embodiment of a SERS structure at a first intermediate fabrication stage, according to one or more illustrative embodiments.
Figure 18:
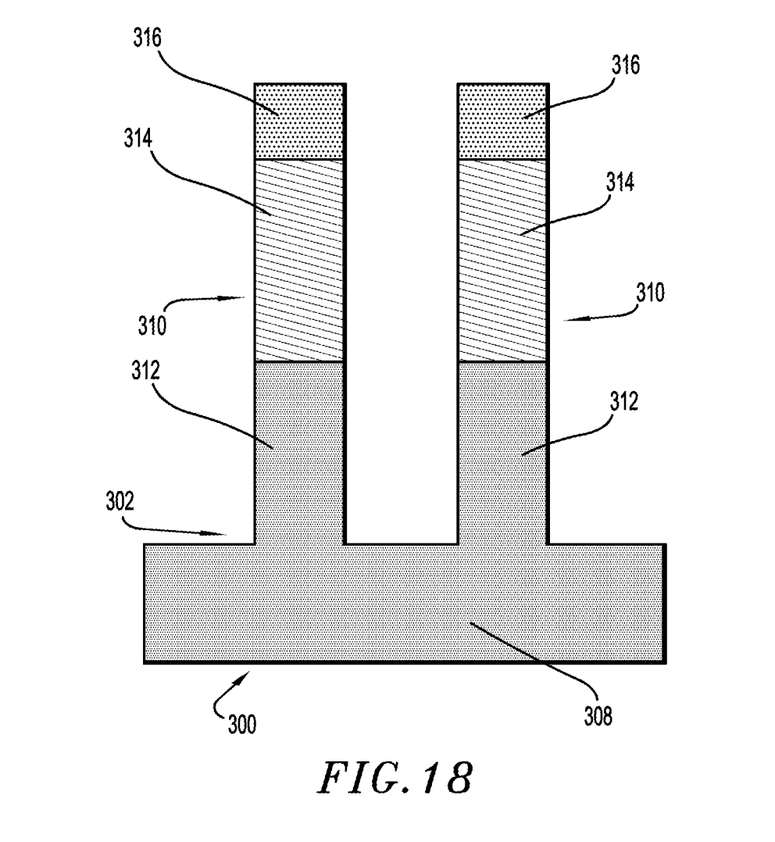
FIG. 18 is a side cross-sectional view of a SERS structure of FIG. 17 at a second intermediate fabrication stage, according to one or more illustrative embodiments.
Figure 19:
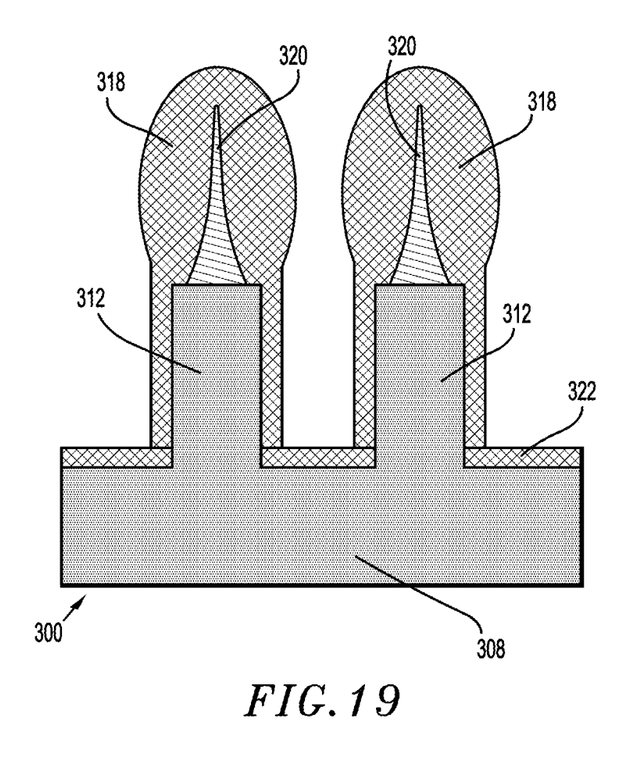
FIG. 19 is a side cross-sectional view of a SERS structure of FIG. 18 at a third intermediate fabrication stage, according to one or more illustrative embodiments.

FIGS. 17-19 illustrate another SERS structure and methodology of fabricating same in accordance with another illustrative embodiment of the present disclosure. In accordance with this embodiment, an epitaxy is used, for example, silicon germanium (SiGe), to epitaxially grow as a groom layer on a silicon substrate. SiGe can be undoped or doped with boron (B), phosphorus (P), arsenic (As) and/or gallium (Ga). Other materials which could function as a groom layer are also envisioned including boron doped silicon (Si:B), phosphorus doped Si (Si:P), and/or arsenic doped silicon (Si:As). The use of an epitaxy like SiGe will enhance the oxidation process and also provides precise control over the height and width of the formed pillars. Other deposition materials serving as a groom layer may also be utilized. Thus, with reference to FIG. 17, the SERS structure 300 includes a substrate 302, a layer of epitaxy 304 and a hard mask 306 on the layer of epitaxy 304. The layer of epitaxy 304 is initially deposited on the substrate 302 and permitted to epitaxially grow to a precise height prior to applying the hard mask 306. The substrate 302 may be formed of silicon and the hard mask 306 may be formed of a silicon nitride although other materials are also envisioned. With reference to FIG. 18, the substrate 302 and the layer of epitaxy 304 are subjected to a sub lithographic process, for example, an orthogonal sidewall imaging transfer, to form the base 308 and the pillars 310 extending from the base 308. The pillars 310 each comprise a substrate section 312, a layer or section of epitaxy 314 and a hard mask 316. In some embodiments, the epitaxy layer 314 can have a non-uniform composition. In the case that the epitaxy layer 314 is SiGe, the Ge % can increase gradually from the bottom of the epitaxy layer to the top of the epitaxy layer. For example, Ge % can change from about 10% at the bottom to about 60% at the top of the epitaxy layer. The higher Ge % results in a higher oxidation rate. Therefore, by using the SiGe layer with Ge % gradient, more SiGe is converted to oxide at the top than bottom, resulting in sharp SiGe tip at top. Similarly, we can vary dopants such as boron, phosphorus, arsenic in the epitaxy layer. Dopants enhance the oxidation. The layer 314 can also be formed on the substrate by other techniques such as layer transferring or bonding.

Thereafter, the hard mask 316 is removed to expose the layer of epitaxy 314, for example, the SiGe groom layer. Thereafter with reference to FIG. 19, the pillars 310 are subjected to an oxidation process, converting a portion of SiGe into oxide material 318. The oxidation process selected will oxidize the SiGe of the layer of epitaxy 314 at a much faster rate than the substrate section 312 of silicon. In one illustrative embodiment, the wet oxidation process is selected such that the rate of oxidation of the layer of epitaxy 314, i.e., the SiGe groom layer, is greater than 20 times the rate of oxidation of the silicon substrate 302. As a result of the wet oxidation process, the SiGe epitaxy 314 segment of the pillars 310 each define a taper tip segment 320. In embodiments where the substrate 302 is formed of ceramic or glass, the oxide is only applied to the groom material, i.e., the layer of epitaxy 314.

The methodology is continued by depositing a dielectric or oxide on the SERS structure 300 and recessing the dielectric to expose the tapered tip segments 320 of the SiGe epitaxy layer, depositing the plasmonic coating, applying the sacrificial material onto the plasmonic coating, etching the sacrificial layer to expose the juncture area of the tapered tip segments, and etching through the plasmonic material to isolate the tapered tip segments 320 of the pillars 310 from the remaining planar base 322 as discussed in connection with FIGS. 6-10.

Figure 20:
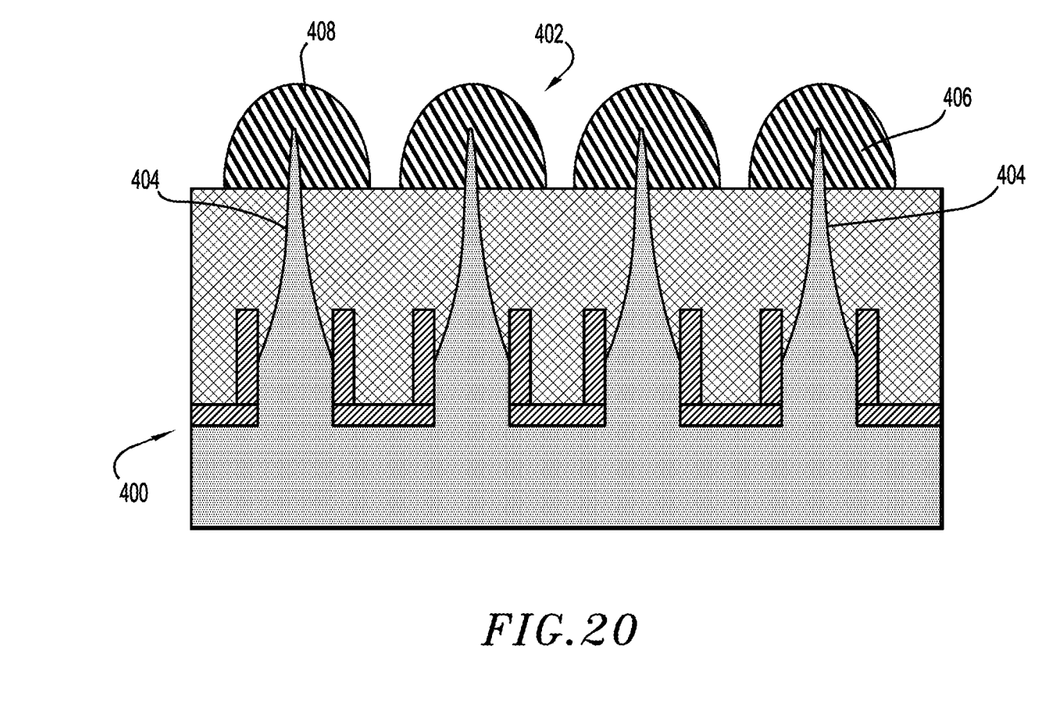
FIG. 20 is a side cross-sectional view of another illustrative embodiment of a SERS structure at a first intermediate fabrication stage, according to one or more illustrative embodiments.

Referring now to FIG. 20, another illustrative embodiment of the SERS structure 400 is disclosed. In accordance with this illustrative embodiment, a nanosphere array 402 is deposited on the tapered tip segments 404 which may be fabricated in accordance with any of the aforedescribed methodologies. In particular, subsequent to forming the tapered tip segments 404, the plasmonic film material 406 metal is deposited on the structure 400 whereby the plasmonic film material 406 generally follows the topography of the pointed tips of the tapered tip segments 404. A directional etch, such as a reactive-ion etching (RIE), is utilized either simultaneously with the deposition of the plasmonic film material 406 or shortly thereafter to facilitate formation of the spheres 408 on each tapered tip segment and to remove the film material at the juncture of the metal spheres 408 and the oxide fill to isolate and form a gap around each of the spheres relative to the remaining planar surface of the plasmonic film. The result is a dense and uniform grouping of nanospheres on the SERS structure 400 capable of enhancing the output SERS signal "S" from the SERS structure 400 for collection by a detector.

It is envisioned that any of the aforedescribed SERS structure may be a semiconductor or a semiconductor component of a semiconductor and also a component of an integrated circuit. The resulting integrated circuit incorporating the semiconductor components can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices including but not limited to transistors, diodes, capacitors, inductors as part of either (a) an intermediate product, such as a motherboard, or (b) an end product. The end product can be any product that includes integrated circuits, ranging from toys and other low-end applications to advanced computer products having a display, a keyboard or other input device, and a central processor. Systems and hardware incorporating such integrated circuits are considered part of the embodiments described herein.

It is to be understood that the embodiments discussed herein are not limited to the particular materials, features, and processing steps shown and described herein. In particular, with respect to the processing steps, it is to be emphasized that the descriptions provided herein are not intended to encompass all of the processing steps that may be required to form a functional SERS structure.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
 a substrate including a base and a plurality of pillars extending from the base, the pillars having end portions configured to define a nano-array;
 a dielectric layer disposed on the base and at least partially enclosing the pillars, the dielectric layer having an upper surface, the end portions of the pillars extending beyond the upper surface of the dielectric layer; and
 a plasmonic coating disposed on a surface of the dielectric layer and on the end portion of one or more of the pillars.

2. The apparatus of claim 1, wherein the plasmonic coating is discontinuous such that a gap is defined in the plasmonic coating adjacent an intersection of the end portion of the one or more pillars and the upper surface of the dielectric layer.

3. The apparatus of claim 2, wherein the end portions of the pillars each define a tapered nanotip portion.

4. The apparatus of claim 2, wherein the upper surface of the dielectric layer is planar.

5. The apparatus of claim 2, wherein the one or more pillars comprise an epitaxial layer.

6. The apparatus of claim 1, wherein the end portions of the one or more pillars each define a nanosphere comprising the plasmonic coating with portions thereof disposed on the dielectric layer.

7. The apparatus of claim 6, wherein adjacent nanospheres on the end portions of the one or more pillars are in spaced relation to define a gap therebetween.

8. The apparatus of claim 1, wherein the substrate includes semiconductor components.

9. A method, comprising:
 forming a substrate including a base and a plurality of pillars extending from the base and arranged in spaced relation;
 removing material from end portions of the pillars to define a nano-array;
 depositing a dielectric on the base of the substrate;
 coating with a plasmonic film the end portions of the pillars defining the nano-array and the dielectric; and
 removing plasmonic film segments around each of the end portions of the pillars defining the nano-array.

10. The method of claim 9, wherein removing material from the end portions of the pillars includes subjecting the end portions to a thermal oxidation process.

11. The method of claim 9, wherein removing material from the end portions of the pillars includes subjecting the end portions to an etching process.

12. The method of claim 9, wherein removing the end portions includes forming tapered nanotip portions of the pillars.

13. The method of claim 12, wherein removing plasmonic film segment includes applying a non-conformal deposition of a sacrificial material onto the tapered nanotip portions, and performing at least one etching process to remove the sacrificial material adjacent the tapered nanotip portions to expose and remove the plasmonic film segments to define a gap around the nanotip portions devoid of plasmonic film.

14. The method of claim 12, wherein coating with the plasmonic film includes directional etching to form a nanosphere on each of the tapered nanotip portions of the pillars.

15. The method of claim 9, further including depositing a liner on sidewalls of the pillar prior to depositing the dielectric on the base of the substrate.

16. A method, comprising:
 forming a substrate including a base and a plurality of pillars extending from the base and arranged in spaced relation;
 applying a liner onto the pillars and the base;
 depositing an oxide fill on the base to fill gaps between the pillars;
 planarizing the oxide fill to be coplanar with the pillars;
 removing at least a portion of the oxide fill and the liner to at least partially expose the pillars;
 removing material from end potions of the pillars by one of an oxidation process and etching process to form tapered nanotip portions;
 depositing a second oxide fill onto the base of the substrate;
 exposing the tapered tip portions of the pillars from the second oxide fill;
 coating with a plasmonic metal film the tapered tip portions of the pillars and an exposed surface of the second oxide fill; and
 removing plasmonic film surrounding each tapered tip portion of the pillars to isolate the plasmonic film on the tapered tip portions from the plasmonic film on the surface of the second oxide film.

17. The method of claim 16, wherein removing the plasmonic film includes applying a non-conformal deposition of a sacrificial material onto the tapered nanotip portions, and performing at least one etching process to remove the sacrificial material adjacent the tapered nanotip portions to expose and remove the plasmonic film segments to define a gap around the nanotip portions devoid of plasmonic film.

18. The method of claim 16, wherein forming the substrate includes growing an epitaxial layer on the substrate such that the pillars each include an epitaxial layer.

19. The method of claim 18, further including removing material from end portions of the pillars includes subjecting the epitaxial layer to a wet oxidation process.

20. The method of claim 16, further including directional etching the plasmonic film to form a nanosphere on each tapered nanotip portion.

* * * * *